Oct. 27, 1942.   I. I. BORNSTEIN   2,299,730
VESSEL ATTACHMENT
Filed Nov. 23, 1938
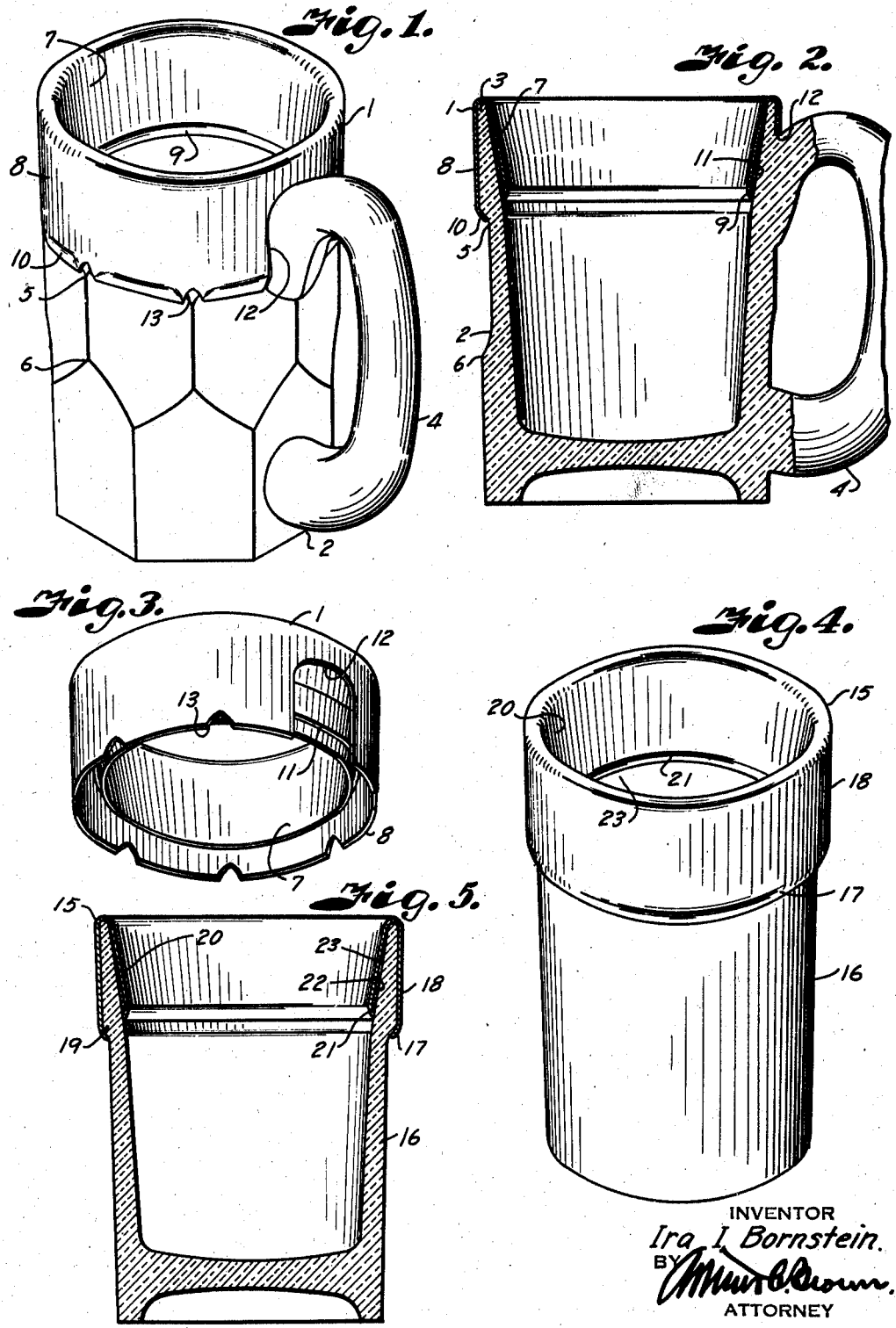
INVENTOR
Ira I. Bornstein.
BY
ATTORNEY Patented Oct. 27, 1942

2,299,730

UNITED STATES PATENT OFFICE 2,299,730

VESSEL ATTACHMENT

Ira I. Bornstein, Kansas City, Mo.

Application November 23, 1938, Serial No. 241,980

4 Claims. (Cl. 65—13)

This invention relates to vessel attachments and more particularly to an attachment for drinking and like vessels for protectively covering the lip or rim thereof.

The principal objects of the invention are to provide a covering for the lip of a drinking vessel capable of preventing breakage or chipping of undamaged vessels to prolong the effective life thereof, and capable of covering chipped or like rims of damaged vessels, the latter vessels thus being suitably reconditioned for continued service.

Other important objects of the present invention are to provide a reinforcing vessel attachment of this nature arranged to fit vessels having handles, such as beer or like steins and particularly glasses, for example, which are "frozen" preparatory to serving drinks therein; to provide for fitting the attachments to vessels having various types of exterior configurations; to prevent leakage between the vessel and attachment; to maintain a cold effect for the vessel when cooled liquids are contained therein; and to provide improved parts and arrangements thereof for producing an attractive, economical and efficient vessel attachment of this nature.

In accomplishing these and other important objects of the present invention, I have provided improved details of structure, the preferred forms of which are illustrated in the accompanying drawing, wherein:

Fig. 1 is a perspective view of a vessel provided with an attachment embodying the features of the present invention.

Fig. 2 is a vertical cross-sectional view taken substantially centrally through the vessel and attachment, particularly illustrating the relation of the sealing element to the vessel and attachment.

Fig. 3 is a detail perspective view of the preferred form of the attachment per se.

Fig. 4 is a perspective view of a modified form of vessel having an attachment embodying my invention applied thereto, the attachment being modified to correspond to the vessel.

Fig. 5 is a vertical cross-section through the vessel illustrated in Fig. 4, illustrating the relation between the vessel, attachment and sealing element.

Referring more in detail to the drawing:

1, Fig. 3, designates an attachment embodying the features of the present invention, which preferably includes a shield of a suitable metal such as brass, Monel metal, stainless steel or the like, or which, if desired, may be formed of waxed or like paper, plastic substances, such as "Bakelite," or other suitable materials.

The attachment or shield 1 is arranged to be mounted on a suitable vessel 2, preferably designed to contain liquid intended to be drunk from the vessel. A suitable vessel of this character is illustrated in Figs. 1 and 2, wherein a beer stein is illustrated, having a rim or lip 3, preferably with a tapered inner surface, a handle 4, and exterior configurations 5 and 6.

The shield 1 is arranged to be mounted on the rim 3 of the vessel and to this end, has depending inner and outer flanges 7 and 8 respectively, the lower edge of the inner flange 7 being turned inwardly, as shown at 9, substantially into engagement with the inner tapered surface of the vessel to prevent seepage of liquid under the shield. The lower edge of the outer flange 8 is similarly turned inwardly, as shown at 10, substantially into engagement with the outer surface of the vessel in such a manner as to secure the shield over the rim of the vessel.

It has been found desirable to provide additional means for preventing seepage of liquid from the interior of the vessel between the inner flange 7 of the shield and the inner surface of the vessel which might leak out of the vessel while it is being used for its intended purpose. To this end, a gasket 11 is interposed between the flange 7 and inner surface of the vessel adjacent the rim portion thereof, which gasket forms a sealing element to prevent such unintended leakage from the vessel.

Where, as illustrated in Figs. 1 and 2, the vessel is provided with a handle, the outer flange 8 of the shield is notched, as indicated at 12, to fit over and about the handle and allow the shield to adequately engage the vessel and fit snugly upon the upper edge of the rim of the vessel.

Also, where exterior configurations are provided on the vessel, the lower edge of the outer flange is notched, as at 13 to allow the adjacent inwardly turned edges of the lower edge of the flange to fit over and about the configurations and be extended into engagement with the outer surface of the vessel, thus anchoring the shield to the vessel, and also forming ventilating vents to allow circulation of air between the outer surface of the vessel and the inner surface of the shield.

This feature also makes the outer flange flexible and facilitates removal of the shield when it is to be cleansed or replaced.

When, for example, beer or other liquids are served in vessels of the character contemplated by this invention, the steins or glasses are "frozen" or chilled prior to serving the drink in order to maintain the drink in a cold state over longer periods of time. The "freezing" of the steins or glasses makes the glass or other material from which they are formed brittle and likely to break. The shield embodying my invention therefore reinforces the rim of the vessel and overcomes breakage losses.

It is well known that glass is a poor conductor of heat and when a person is drinking a stein of beer or the like, contact of the glass with his lips gradually warms that particular spot on the rim of the glass and gives the drinker the impression that the beer is warm. The shield embodying my invention when formed of brass, for example, effects a heat transfer from other particles of the glass to cool the lip contacting portion of the vessel and thus produce the effect of a cold drink as long as the drink lasts.

The shield 15, illustrated in Figs. 4 and 5, is of substantially the same character as that shown in the preferred form of invention with the exception that where a vessel 16 without a handle is employed, a notch is unnecessary and the lower edge 17 of the outer flange 18 of the shield may be turned inwardly into engagement with the outer surface of the vessel and over the lower portion 19 of a rim or lip on the vessel in such a manner as to anchor the attachment to the vessel.

As in the preferred form of invention, an inner flange 20 is provided for the shield having an inwardly turned lower edge 21 which may engage the inner surface of the vessel to form a water and air tight seal.

A sealing element 22 may also be employed in interposed relation to the inner flange 21 of the shield and the inner surface 23 of the vessel in such a manner as to prevent leakage between the shield and vessel.

The attachment embodying the features of the present invention may be employed for protectively covering the rims or lips of damaged vessels which have been chipped or cracked, the attachment having been found to adequately cover such damaged portions of the vessel and thus allow the vessel to be used over periods of time longer than undamaged vessels lacking the present attachment, due to the fact that the attachment protects the vessel against further breakage and absorbs shocks and jars applied to the vessels, for example when rinsing or washing a number of vessels. When the attachments are applied to new vessels, they are found to maintain the vessels in an undamaged state over long periods of time. The attachments may be washed at the same time the vessels are washed, or if desired, may be removed for cleaning and like purposes or for transfer to other vessels. Attachments constructed in accordance with the present invention are attractive, economical, and efficient in accomplishing the purposes for which they are intended.

What I claim and desire to secure by Letters Patent is:

1. In an attachment of the character described arranged to be mounted on a drinking vessel having a rim and exterior configurations, a metal shield engageable over said rim having depending flanges of thin metal engaged with the inner and outer surfaces of said vessel, the lower edge of the outer flange being turned inwardly substantially into engagement with the outer surface of the vessel below said rim, the outer flange having spaced notches in the lower edge thereof to fit the flange onto and about the exterior configurations of the vessel for anchoring the shield thereto.

2. In an attachment of the character described arranged to be mounted on a drinking vessel having a rim and exterior configurations, a metal shield engageable over said rim having depending flanges of thin metal engaged with the inner and outer surfaces of said vessel, the lower edge of the inner flange being turned inwardly and downwardly substantially into engagement with the inner surface of said rim, the lower edge of the outer flange being turned inwardly substantially into engagement with the outer surface of the vessel below said rim, the outer flange having spaced notches in the lower edge thereof to fit the flange onto and about the exterior configurations of the vessel for anchoring the shield thereto.

3. In an attachment of the character described arranged to be mounted on a drinking vessel having a rim and exterior configurations, a metal shield engageable over said rim having depending flanges of thin metal engaged with the inner and outer surfaces of said vessel, the lower edge of the inner flange being turned inwardly and downwardly substantially into engagement with the inner surface of said rim, the lower edge of the outer flange being turned inwardly substantially into engagement with the outer surface of the vessel below said rim, the outer flange having spaced notches in the lower edge thereof to fit the flange onto and about the exterior configurations of the vessel for anchoring the shield thereto, and a gasket interposed between a wall of said vessel and a flange of the shield adjacent thereto for preventing seepage of liquid contained in the vessel between said wall and shield.

4. In an attachment of the character described arranged to be mounted on a drinking vessel having a rim, a metal shield engageable over said rim having depending flanges of thin metal engaged with the inner and outer surfaces of said vessel, a gasket interposed between a wall of said vessel and the inner flange of the shield for preventing seepage of liquid contained in the vessel between said rim thereof and the shield, the lower edge of the inner flange being turned inwardly and downwardly substantially into engagement with the inner surface of said rim to retain said gasket in place, the lower edge of the outer flange being turned inwardly and downwardly substantially into engagement with the outer surface of the vessel below said rim.

IRA I. BORNSTEIN.